July 12, 1966   F. HENNIG ET AL   3,260,181
CAMERAS WITH BUILT-IN FLASH ASSEMBLIES
Filed May 15, 1964   3 Sheets-Sheet 2
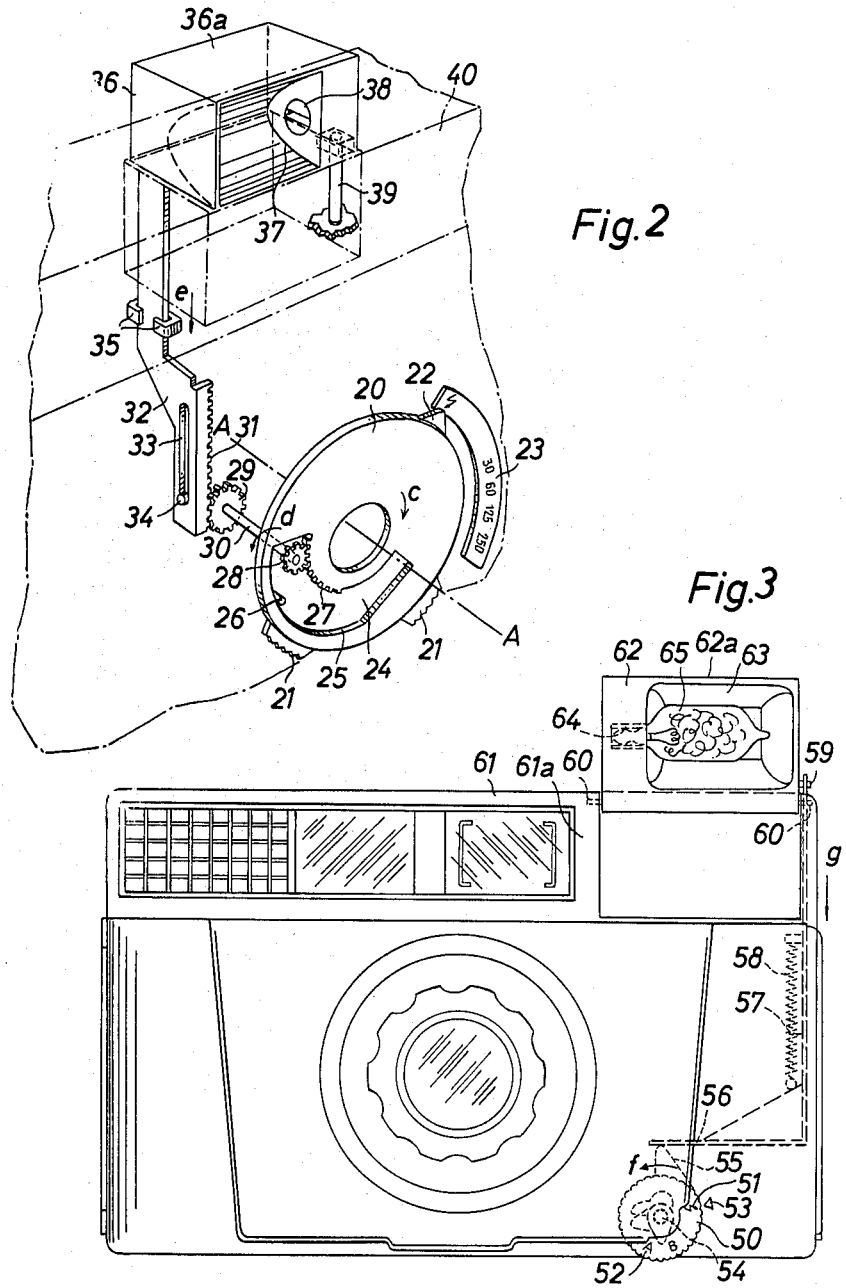
INVENTOR.
JOACHIM v. ALBEDYLL
BY FRIDOLIN HENNIG

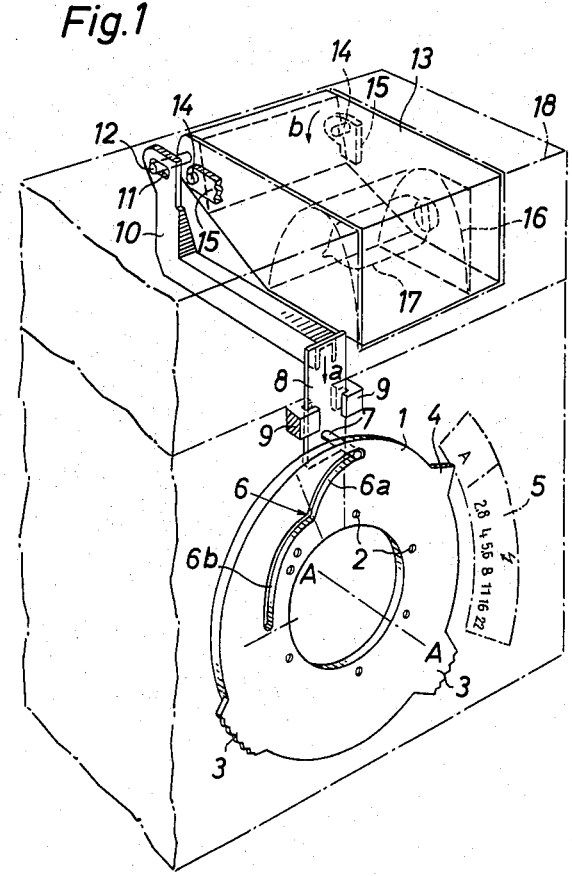

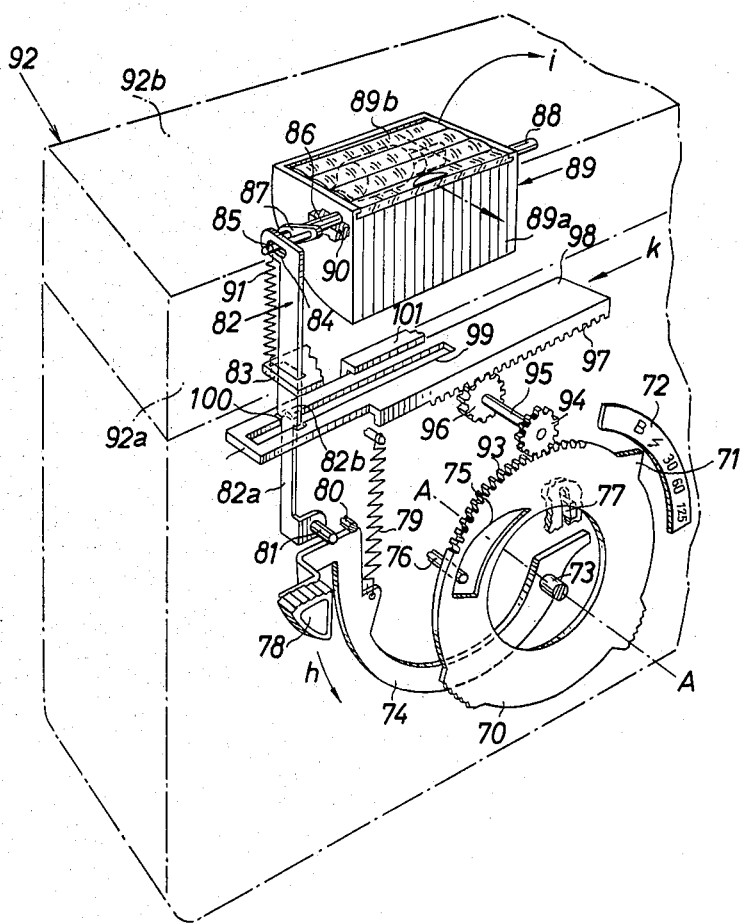

United States Patent Office 3,260,181
Patented July 12, 1966

3,260,181
CAMERAS WITH BUILT-IN FLASH ASSEMBLIES
Fridolin Hennig and Joachim von Albedyll, both of Munich, Germany, assignors to Agfa Aktiengesellschaft, Leverkusen, Germany
Filed May 15, 1964, Ser. No. 367,735
Claims priority, application Germany, May 18, 1963, A 43,144
15 Claims. (Cl. 95—11)

The present invention relates to cameras.

More particularly, the present invention relates to cameras with built-in flash assemblies, particularly of the type which include a reflector which must be moved from a rest position to an operative position.

With conventional cameras of this type it is necessary for the operator to move the reflector to its operative position before making a flash exposure, so that the operator must carry out certain manual operations solely in connection with the flash assembly before and after making one or more flash exposures.

It is a primary object of the present invention to provide a camera structure of the above type which requires the operator only to make normal camera adjustments which in any event are required for flash exposures, without however requiring the operator to carry out any operations with respect to the flash assembly itself.

In particular it is an object of the invention to provide a structure capable of automatically moving a flash assembly to its operative position when the operator manipulates a manually operable means of the camera which must in any event be manipulated in connection with the making of a flash exposure.

Thus, the objects of the present invention include the provision of a structure capable of automatically moving a flash assembly to its operative position when the operator carries out operations such as, for example, setting the camera to an exposure time suitable for flash exposure, setting the camera to an aperture suitable for flash exposure, releasing the shutter of the camera to make a flash exposure, or manipulating a selector means which selectively places the camera in a position ready for making flash exposures.

With the above objects in view, the invention includes, in a camera, a camera housing and a flash assembly supported by the housing for movement between rest and operative positions. A manually operable means is carried by the camera housing to be manipulated in connection with the making of a flash exposure, and a transmission is connected between the manually operable means and flash assembly for moving the latter to its operative position in response to manipulation of the manually operable means in connection with the making of a flash exposure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection wtih the accompanying drawings, in which:

FIG. 1 is a perspective illustration of one possible embodiment of a structure of the invention shown in association with a camera housing fragmentarily illustrated in dot-dash lines;

FIG. 2 is a perspective view of another embodiment of a structure according to the invention also shown with a camera housing fragmentarily illustrated in dot-dash lines;

FIG. 3 is a front elevation of a third embodiment of the invention shown in FIG. 3 in its operative position; and FIG. 4 is a perspective illustration of a fourth embodiment of a structure according to the invention, the structure being shown in FIG. 4 also with a camera housing which is fragmentarily illustrated in dot-dash lines.

Referring now to FIG. 1, there is shown therein one embodiment of the invention adapted to be associated with a camera having a known and unillustrated exposure control device. The camera housing, which is fragmentarily illustrated in dot-dash lines in FIG. 1, carries a rotary manually operable means 1 in the form of a ring capable of being turned about the optical axis AA which passes through the center of the ring, and this ring 1 is situated in a plane normal to the optical axis and is provided with finger pieces 3 accessible to the operator to facilitate turning of the ring 1 which in the illustrated example is capable of being manipulated to set the diaphragm. This ring 1 may be mounted, for example, at the rear wall of a shutter housing. The turning of the ring 1 may be used for adjusting the aperture of an iris diaphragm the blades of which may, for example, have pins received in the bores 2 of the ring 1. Thus the ring 1 can form the bearings for the diaphragm blades, although it is also possible to use the ring 1 merely for the purpose of providing a manually turnable ring which in such a case can be coupled to a special ring which is operatively connected to the diaphragm blades to support the latter for rotary movement, for example. The ring 1 carries a peripheral, pointed projection 4 which acts as an index to cooperate with a scale 5 carried by the camera housing, and this scale 5 has a symbol A indicating the position in which the ring 1 is to be placed when the camera is to be set for automatic operation, and indeed the ring 1 is illustrated in this position in FIG. 1. The automatic operation referred to above is a well known automatic operation where a light responsive structure automatically sets the diaphragm and/or the exposure time. The scale 5 includes also a series of graduations indicating various aperture settings, and the range of the scale 5 which includes the specific aperture settings also carries a symbol indicating that this range of settings is to be used for flash exposures.

The ring 1 is formed with a camming slot 6 which receives a pin 7 of a moving or transmission means which also includes a displaceable member 8 which fixedly carries the pin 7 which extends parallel to the optical axis. Suitable guide members 9 are carried by the camera housing to guide the displaceable member 8 for straight-line vertical movement in response to turning of the ring 1. This displaceable member 8 includes a rearwardly extending arm 10 having at its upper rear end portion a horizontal slot 11 receiving a pin 12 which extends perpendicular to the optical axis and which is fixed to a flash assembly which includes the casing 13 to which the pin 12 is directly fixed. This outer casing 13 of the flash assembly is also fixed to a pair of coaxial pins 14 respectively supported for turning movement by bearings 15 which are fixedly carried by the camera housing, so that in this way the flash assembly is carried by the camera housing for turning movement about the common axis of the pins 14 between the rest position shown ing FIG. 1 and an operative position. The casing 13 carries in its interior a reflector 16 having at one end a lamp socket for receiving the flash lamp 17.

When the flash assembly is in the rest position shown in FIG. 1 it is situated within a recess formed in the upper part 18 of the camera housing, and at this time the exterior walls of the casing 13 are flush with and form continuations of the upper and front walls of the upper part 18 of the camera housing.

In the event that it is desired to make a flash exposure, the operator will turn the ring 1 until its index 4 is aligned with the selected aperture indicated by the scale 5. This rotary movement of the index 4 from the symbol A to the first one of the graduations of the scale 5 which is encountered by the index 4 as it moves away from the symbol A causes the camming portion 6a to turn relative to the pin 7 so as to pull the latter downwardly and thus displace the displaceable member 8 of the transmission means 7–12 downwardly in the direction of the arrow a. The arm 10 of course moves down with the remainder of the member 8 so that the pin 12 is displaced downwardly with the result that the casing 13 is turned in the direction of the arrow b about the common axis of the pins 14 through approximately 90° to an upright operating position where the reflector 16 is directed forwardly and is thus in an operative position. The continued turning of the manually operable means 1 displaces the camming portion 6b of the camming slot 6 with respect to the pin 7, but this camming portion 6b extends along a circle whose center is in the optical axis so that at this time where is no further movement of the flash assembly 13–17, and thus the operator can place the index 4 at any selected aperture in the range of apertures of the scale 5 indicated as suitable for flash operation without moving the flash assembly away from its operative position.

If, after making one or more flash exposures it is desired to make an exposure without flash illumination, then the operator will simply return the manually operable means 1 to its position where the index 4 is aligned with the symbol A of the scale 5, and in this way the displaceable member 8 of the transmission means 7–12 is moved in a direction opposite to that indicated by the arrow a so as to return the flash assembly 13–17 to the illustrated rest position.

With the embodiment of FIG. 2 there is a manually operable means in the form of an exposure time setting ring 20 which is mounted for rotary movement about the optical axis AA, and this ring 20 is also in a plane normal to the optical axis. The ring 20 has finger pieces 21 accessible to the operator and also includes an index 22 movable relative to a stationary scale 23 carried by the camera housing. The scale 23 includes exposure time graduations as well as a symbol for the position in which the ring 20 should be placed for making flash exposures, so that the ring 20 forms also a manually operable means manipulated in connection with the making of flash exposures. The ring 20 is formed with a cutout 24. One of the edge portions which defines part of the cutout 24 forms a camming edge 25 cooperating with a control pin 26 for setting the exposure time of the camera in a manner well known in the art according to the angular position of the ring 20.

Another edge portion which defines part of the cutout 24 is provided with teeth 27 forming a segment of a gear and meshing with a pinion 28 fixed together with a coaxial pinion 29 to a common shaft 30 which extends parallel to the optical axis and is supported for rotary movement by any suitable unillustrated bearings which are carried by the camera housing. The pinion 29 meshes with a rack 31 of a displaceable member 32 which together with the above-described gear train forms a moving or transmission means for moving a flash assembly between its rest and operative positions. The displaceable member 32 is formed with an elongated slot 33 receiving a stationary pin 34 which is fixed to the camera, and in addition suitable stationary guides 35 of the camera guide the displaceable member 32 for vertical movement, so that in this way the vertical member 32 can only move up and down in a straight line.

The top end of the displaceable member 32 of the transmission means is fixed to a flash assembly which includes the casing 36 carrying in its interior a reflector 37 which is open at its front portion and which carries at one end a lamp socket 38. The casing 36 in addition is formed with a guide bore receiving a stationary guide rod 39 which is fixedly carried by the camera.

In the position of the parts illustrated in FIG. 2 the flash assembly 36–38 has been displaced to its operative position where it is situated outside of a recess formed in the upper part 40 of the camera.

In the event that it is desired to make an exposure without flash illumination, the manually operable means 20 is turned so as to place the index 22 in alignment with a selected exposure time of the scale 23. This rotary movement of the manually operable exposure time setting means 20 in the direction of the arrow c turns the pinions 28 and 29 in the direction of the arrow d, so that the displaceable member 32 is displaced downwardly in the direction of the arrow e. In this way the casing 36 together with the reflector 37 are returned from their operative to their rest position where the reflector 37 and its socket 38 are completely closed off from the exterior of the camera. In the rest position of the flash assembly of FIG. 2 the upper wall 36a of the casing 36 is flush with the top wall of the upper camera part 40.

It is to be noted in connection with FIG. 2 that one of the numerical exposure time settings of the scale 23 will be a setting for the same exposure time as that which is provided for the flash exposure. For example when the index 22 is aligned with the flash symbol of the scale 23, as indicated in FIG. 2, the actual exposure time may be 1/30 sec., which is the same exposure time as the first graduation of the scale 23. However, in spite of the fact that these two settings will provide the same exposure time, the flash assembly will be displaced to its operative position only when the index 22 is aligned with the flash symbol in order to provide at this time for flash operation the same exposure time that the camera is capable of providing during other than flash exposure.

The camera of FIG. 3 includes a known and unillustrated automatic exposure control device capable of being rendered inactive by a manually operable selecting means 50. This selecting means 50 is supported for rotary movement by the camera housing and has a symbol A capable of being aligned with a stationary index 53 in order to place the selecting means 50 in a position which sets the camera for automatic exposure control. The selecting means includes in addition to the member 50 which is accessible to the operator a shaft 54 which is fixed to the accessible member 50 for rotary movement therewith, and this shaft 54 carries a plurality of cams for the purpose of rendering the automatic exposure control device inactive and placing the camera in a condition for manual operation where, for example, the diaphragm can be manually set.

The cam shaft 54 carries an additional cam 55 which forms part of a transmission means for moving a flash assembly to its operative position when the selecting means 50 is displaced to the position for flash operation. This selecting means 50 includes, in addition to the symbol 52 for automatic operation, a symbol 51 for flash operation, and in the position of the parts shown in FIG. 3 the symbol 51 is aligned with the index 53.

The transmission includes in addition to the cam 55 a displaceable member 57 guided for straight line movement in a vertical direction and having an arm 56 directly engaging the cam 55. In order to maintain the member 57 in engagement with the cam 55 a spring 58 is fixed at one end to an element which is fixed to and projects from the member 57 and at its opposite, lower end to a stationary part of the camera, so that the spring 58 urges the displaceable member 57 in the direction of the arrow g. In the same way as described above in connection with FIG. 1, the upper end of the member 57 is formed with a horizontal slot receiving a pin 59 fixed to the casing 62 of the flash assembly. This casing 62 fixedly carries a pair of coaxial pins 60 supported for turning movement in suitable stationary bearings carried by the upper part 61 of the camera housing, and of course the pin 59 is displaced from the common turning axis provided by the pins 60. The flash assembly includes, in addition to the casing 62, a reflector 63 which is open toward the front in the operative position shown in FIG. 3 and which carries a socket 64 for receiving the lamp 65. The member 50 was previously turned in a clockwise direction, as viewed in FIG. 3, to the position shown in FIG. 3, so that the cam 55 acts on the arm 56 of member 57 to raise the latter in opposition to the spring 58 and thus turn the flash assembly 62–64 through approximately 90° to the illustrated operative position, this movement of the flash assembly corresponding to that described above in connection with FIG. 1.

When the selector 50 is turned together with the shaft 54 in the direction of the arrow $f$ until the automatic symbol 52 is aligned with the index 53, the displaceable member 57 is moved downwardly by the spring 58 in the direction of the arrow $g$, and the result is that the transmission of FIG. 3 turns the flash assembly back to its rest position about the common axis of the pins 60 until the upper surface 62a of the casing 62, as viewed in FIG. 3, is flush with the front wall 61a of the upper part 61 of the camera.

In the embodiment of the invention which is illustrated in FIG. 4, an exposure time setting ring 70 is supported for rotary movement about the optical axis AA and has an index 71 capable of being aligned with a selected symbol of the scale 72 which is fixedly carried by the camera housing. This scale 72 includes a symbol for bulb exposure, a symbol for flash exposure, and a plurality of numerical exposure time graduations. In a manner similar to that described above in connection with ring 20 of FIG. 2, the ring 70 is formed with a cut-out one edge 75 of which forms an exposure time controlling cam cooperating with the exposure time determining pin 76 of the exposure time regulating mechanism which is conventional and well known in the art.

Furthermore, a manually operable means in the form of a shutter release lever 74 is supported for rotary movement by a stationary pin 73 carried by the camera housing in a position extending parallel to but displaced from the optical axis AA. The lever 74 extends around the optical axis approximately along a semi-circle. One end of the lever 74 cooperates with the shutter releasing pawl 77 part of which is illustrated in FIG. 4, while the other end of the lever 74 carries a finger piece 78 accessible at the front of the camera. Furthermore, one end of a return spring 79 is fixed to the lever 74, and the opposite end of this spring is fixed to a stationary part of the camera so that the spring 79 urges the lever 74 to the starting position illustrated in FIG. 4 where the lever 74 engages a stationary stop pin 80.

The moving or transmission means of FIG. 4 includes a pin 81 engaging the lever 74 and fixed to a displaceable member 82 guided by suitable guide members only part of which are illustrated, the guides 83 guiding the member 82 for vertical, straight line movement. The upper end of the member 82 is formed with a horizontal slot 84 receiving a pin 85 which is fixed to a crank lever 87 which is in turn fixed to a pin 86. The pin 86 is coaxial with a pin 88, and both of these pins are fixed to the casing 89 of the flash assembly of this embodiment, these pins 86 and 88 being supported for turning movement in suitable stationary bearings 90 carried by the camera housing. Between the pin 85 and the guide 83 is a tensioned spring 91 which is weaker than the spring 79 and which urges the flash assembly to turn in the direction of the arrow $i$. The spring 91 thus also maintains the pin 81 in engagement with the lever 74.

The casing 89 of the flash assembly accommodates in its interior a reflector and lamp socket, and there is shown in FIG. 4 the lower wall 89a of the flash assembly which in the illustrated rest position thereof is flush with the front wall 92a of the upper camera part 92. This lower wall 98 is opaque. In the rest position of the flash assembly shown in FIG. 4 the front side 89b of the flash assembly is substantially flush with the upper wall 92b of the upper part 92 of the camera, and this front part 89b can take the form of a transparent light-dispersing plate.

The exposure time setting ring 70 is provided along part of its periphery with gear teeth 93, forming a gear segment meshing with a pinion 94 which is fixed together with a coaxial pinion 96 to a shaft 95 supported by unillustrated bearings for rotary movement. The pinion 96 meshes with a rack 97 of a horizontally slidable blocking means 98 guided for movement in suitable guides 101 which are carried by the camera housing. This blocking means 98 is formed with an elongated slot 99 the width of which is only slightly greater than the width of the lower portion 82a of the displaceable member 82 of the transmission, and a portion of the slot 99 is widened by the aligned notches 100 providing the slot 99 at the notches 100 with a width greater than the width of the upper portion of the displaceable member 82, this upper portion extending upwardly from the lower narrower portion 82a and forming a pair of shoulders therewith.

With the parts in the position shown in FIG. 4, the exposure time setting means 70 has been set for flash operation and in order to make an exposure the finger piece 88 is displaced together with the lever 74 in the direction of the arrow $h$, and the turning of the lever 74 permits the pin 81 and member 82 to move downwardly under the action of the spring 91. In this way through the pin-and-slot connection 84, 85 the crank lever 87 and the coaxial pins 86 and 88 are turned so as to turn the casing 89 in the direction of the arrow $i$. The transmission is designed so that the front side 89b of the casing 89 is in a vertical plane before the right end of the lever 74, as viewed in FIG. 4, engages the release pawl 77.

After the pawl 77 is released to open the shutter and make the exposure the operator will release the finger piece 78 so that the spring 79 returns lever 74 to its starting position, and inasmuch as the spring 79 is stronger than the spring 91, the lever 74 engages the pin 81 to return the displaceable member 82 upwardly so as to swing the flash assembly back to its rest position shown in FIG. 4. Thus, at this time the flash assembly turns in a direction opposite to that indicated by the arrow $i$.

If the ring 70 is displaced from the position of FIG. 1 where it is set for flash illumination, and is instead turned to align its index 71 with one of the numerical exposure time graduations of the scale 72, then the teeth 93 will turn the pinions 94 and 96 so as to displace the blocking means 98 to a position where the wider portion 100 of the slot 99 is out of alignment with the member 82. At this time the blocking means 98 is moved in the direction of the arrow $k$, and the result is that the edge portions which define the slot 99 become located beneath the shoulders or projections of the member 92 located at the junctions between the wider and narrower portions thereof. If the finger piece 78 is again turned in the direction of the arrow $h$, at this time when the index 71 is aligned with one of the numerical graduations of the scale 72, then the pin 82 cannot follow the lever 74 when it is actuated to open the shutter inasmuch as the shoulders or projections of the member 82 engage the blocking member 98. Thus, in this position of the parts, in spite of actuation of the shutter release lever 78, the flash assembly remains in the illustrated rest position.

The arrangement of FIG. 4 provides the additional advantage of automatically returning the flash assembly to its rest position after each flash exposure.

It will be understood that each of the elements described above, or two or more together, may also find a useful application in other types of cameras differing from the types described above.

While the invention has been illustrated and described as embodied in cameras with flash assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing; a flash assembly carried by said camera housing for movement along a first predetermined path between rest and operative positions; exposure factor determining means spaced from said flash assembly and movably carried by said camera housing for movement along a second predetermined path different and spaced from said first predetermined path of movement of said flash assembly, said exposure factor determining means being at least movable between a flash position providing an exposure setting for an exposure with flash illumination and at least one other position providing an exposure setting for an exposure without flash illumination; and moving means operatively connected to said flash assembly and said exposure factor determining means for, only in response to movement of said exposure factor determining means into said flash position thereof, moving said flash assembly from said rest at least partly to said operative position thereof, whereby said exposure factor determining means will provide said exposure setting for an exposure without flash illumination without displacing said flash assembly from rest toward operative position and will displace said flash assembly from rest at least partly to said operative position thereof only when said exposure factor determining means is moved into said flash position thereof.

2. In a camera, in combination, a camera housing; a flash assembly carried by said housing for movement along a first predetermined path between rest and operative positions; exposure time setting means spaced from said flash assembly and movably carried by said housing for movement along a second predetermined path different and spaced from said first predetermined path of movement of said flash assembly, said exposure time setting means being at least movable between a flash position providing an exposure time for an exposure with flash illumination and at least one other position providing an exposure setting for an exposure without flash illumination; and transmission means operatively connected to said exposure time setting means and said flash assembly for transmitting movement of said exposure time setting means to said flash assembly for displacing the latter from said rest at least partly to said operative position only when said exposure time setting means is placed in said flash position thereof, whereby said exposure factor determining means will provide said exposure setting for an exposure without flash illumination without displacing said flash assembly from rest toward operative position and will displace said flash assembly from rest at least partly to said operative position thereof only when said exposure factor determining means is moved into said flash position thereof.

3. In a camera, in combination, a camera housing; a flash assembly carried by said housing for movement along a first predetermined path between rest and operative positions; manually operable exposure time setting means spaced from said flash assembly and carried by said housing for movement along a second predetermined path different and spaced from said first predetermined path of movement of said flash assembly, said manually operable exposure time setting means being at least movable between a pair of positions both of which provide the same exposure time but one of which is for said exposure time with flash illumination while the other is for said exposure time with daylight illumination; and transmission means operatively connected to said exposure time setting means and flash assembly for transmitting movement of said exposure time setting means to said flash assembly for displacing the latter from said rest at least partly to said operative position thereof only when said exposure time setting means is moved to said one of said positions providing said exposure time with flash illumination.

4. In a camera, in combination, a camera housing; a flash assembly carried by said housing for movement along a first predetermined path between rest and operative positions; manually operable means movably carried by said housing spaced from said flash assembly and movable along a second predetermined path different and spaced from said first predetermined path of said flash assembly for setting a diaphragm of the camera to provide a given exposure aperture, said manually operable means being at least movable between a first position providing an aperture suitable for use when making a flash exposure and a plurality of other positions providing different exposure apertures for exposures without flash illumination; and transmission means operatively connected to said manually operable means and said flash assembly for displacing the latter from said rest at least partly to said operative position only when said manually operable means is placed in said first position thereof, whereby said manually operable means will set said diaphragm for said different exposure apertures suitable for an exposure without flash illumination without displacing said flash assembly from said rest toward said operative position and will displace said flash assembly at least toward said operative position thereof only when said manually operable means is moved into said first position thereof.

5. In a camera, in combination, a camera housing; a flash assembly carried by said housing for movement along a first predetermined path between rest and operative positions; manually operable means movably carried by said housing spaced from said flash assembly and movable along a second predetermined path different and spaced from said first predetermined path of said flash assembly for setting a diaphragm, said manually operable means having at least one position for providing an exposure without flash illumination and a plurality of additional positions forming a predetermined range of positions at any one of which an aperture suitable for flash illumination will be provided; and transmission means operatively connected to said manually operable means and to said flash assembly for displacing the latter from said rest to said operative position only in response to placing of said manually operable means in one of said plurality of positions of said range of positions.

6. In a camera, in combination, a camera housing; a flash assembly carried by said housing for movement along a first predetermined path between rest and operative positions; manually operable selector means movably carried by said housing spaced from said flash assembly and movable along a second predetermined path different and spaced from said first predetermined path of said flash assembly for selecting from at least three different types of camera operations one of which is operation with flash exposure; and transmission means operatively connected to said selecting means and flash assembly for displacing the latter from said rest to said operative position only when said selecting means is moved to said position for operating with flash exposure.

7. In a camera, in combination, a camera housing; a flash assembly carried by said housing for movement along a first predetermined path between rest and operative positions; manually operable means movably carried by said camera housing spaced from said flash assembly and movable along a second predetermined path different and spaced from said first predetermined path of said flash assembly to and from a position required for flash exposure; shutter release means carried by said camera housing; moving means operatively connected to said flash assembly and engaging said shutter release means for responding to actuation thereof to release the shutter for moving said flash assembly from said rest at least partly into said operative position; and blocking means operatively connected to said manually operable means for blocking operation of said moving means in response to actuation of said shutter release means except when said manually operable means is in said position required for flash exposure.

8. In a camera as recited in claim 7, spring means operatively connected to said shutter release means for urging the latter to a predetermined starting position, said moving means including a spring weaker than said spring means and urging said moving means to displace said flash assembly from said rest to said operative position thereof, said moving means also including an elongated member having a projection and movable along a predetermined path during displacement of said flash assembly to said operative position, said blocking means being located at the path of movement of said projection to prevent said moving means for displacing said flash assembly to said operative position, and said blocking means being formed with a cutout and being placed by said manually operable means in a position where said cutout is aligned with said projection when said manually operable means is placed in said position required for flash exposure so that in the latter position said projection will be received by said cutout so that said blocking means will not block movement of said moving means and thus of said flash assembly to said operative position thereof.

9. The combination according to claim 7, wherein said moving means include spring means urging said flash assembly to said operative position, said blocking means releasing said moving means and thereby said flash assembly to said spring means to be moved thereby to said operative position when said manually operable means is in said position required for the making of a flash exposure and said shutter release means is actuated.

10. The combination according to claim 1, wherein said moving means is driven by said exposure factor determining means for displacing said flash assembly to said operative position thereof when said exposure factor determining means is manipulated in connection with making of a flash exposure.

11. The combination according to claim 1, further comprising cam means carried by said exposure factor determining means for movement therewith, said moving means engaging said cam means to be actuated by the latter for displacing said flash assembly from said rest to said operative position when said exposure factor determining means is moved into said flash position thereof.

12. The combination according to claim 1, wherein said moving means includes a pinion and rack drive responding to movement of said exposure factor determining means.

13. The combination according to claim 1, wherein said flash assembly is carried by said housing for turning movement about a predetermined axis between rest and operative positions and further including a pin carried by said assembly in a position spaced from and parallel to said axis, and an elongated displacement member formed with an elongated slot receiving said pin, said exposure factor determining means being operatively connected to said displacement member for displacing the latter so as to move said pin and turn said flash assembly about said axis to said operative position when said exposure factor determining means is moved to said flash position thereof.

14. The combination according to claim 1, wherein said flash assembly includes a reflector and a lamp socket, said reflector being large enough to receive a lamp connected to said socket while accommodating said lamp for movement with said assembly between said positions.

15. In a camera, in combination, a camera housing for movement along a first predetermined path; a flash assembly carried by said camera housing and arranged to be placed in rest and operable conditions; manually operable exposure factor determining means spaced from said flash assembly and movably carried by said camera housing for movement along a second predetermined path different and spaced from said first predetermined path of movement of said flash assembly, said manually operable exposure factor determining means being at least movable between a flash position providing an exposure setting for an exposure with flash illumination and a plurality of other positions providing a plurality of exposure settings for exposures without flash illumination; and means operatively connected to said manually operable exposure factor determining means and arranged to cooperate with said flash assembly for, only in response to movement of said manually operable exposure factor determining means into said flash position thereof, placing said flash assembly into said operable condition thereof, whereby said manually operable exposure factor determining means will provide said exposure settings for exposures without flash illumination without placing said flash assembly into said operable condition and will place said flash assembly into said operable condition thereof only when said exposure factor determining means is moved into said flash position thereof.

References Cited by the Examiner
UNITED STATES PATENTS

| | | | |
|---|---|---|---|
| 3,127,824 | 4/1964 | Williams | 95—11 X |
| 3,175,479 | 3/1965 | Beach | 95—11 |

JOHN M. HORAN, *Primary Examiner.*